Jan. 12, 1965    D. G. O'BRIEN    3,165,676
ARMATURE SUSPENSION FOR TORQUE MOTOR
Filed July 11, 1960

INVENTOR.
DONALD G. O'BRIEN
BY Kenway, Jenney,
Witter & Hildreth
ATTORNEYS

3,165,676
ARMATURE SUSPENSION FOR TORQUE MOTOR
Donald G. O'Brien, Cochituate, Mass., assignor to American Measurement & Control, Inc., Waltham, Mass., a corporation of Massachusetts
Filed July 11, 1960, Ser. No. 42,098
2 Claims. (Cl. 317—171)

This invention relates to a torque motor generally, and more particularly, to a novel and improved means for mounting the armature of a torque motor for resiliently restrained limited movement about an axis.

A torque motor of a type with which this invention is concerned comprises an elongated armature pivotally mounted intermediate its ends for resiliently restrained limited angular movement. Each end of the armature is centered between the faces of spaced pole pieces of opposite magnetic polarity. Permanent magnets provide a polarizing flux crossing the air gap between each pair of pole faces with the flux passing through the ends of the armature and also longitudinally through the armature. A plurality of control coils are arranged so that when electrically energized they will effect a modification of the flux passing through the armature. Thus, a change in the current through the control coils changes the magnetic field intensity around the armature and thus the flux passing through it so that the ends of the armature are displaced in opposite directions about the pivotal axis of the armature. The direction of angular movement depends upon the direction that the control flux is induced in the armature by the control coils. The amount of displacement of the armature is dependent upon the amplitude of the control signal impressed upon the control coils. Torque motors of this type are illustrated in United States Patents No. 2,718,614, issued September 20, 1955, and No. 2,891,181, issued June 16, 1959.

In torque motors of the type described, it is a relatively common practice to connect one of the ends of the armature to the load which the motor is to drive. The end of the armature follows an arcuate path about the axis of the armature. However, for the small angles through which the armature curves, the output at the end of the armature is substantially linear. In certain applications it is desirable that the torque motor provide a rotary output, for example, in the form of limited movement of a shaft about its axis. In a torque motor of the type described above, the armature is normally supported on a frame for pivotal movement by means of a shaft or shafts extending from the armature and fixed at their outer ends to the frame. Often the shafts are so constructed that they afford the resilient restraint of movement of the armature. It is conceivable that to provide for rotary output from such a torque motor, the outer end of only one shaft could be anchored to the frame while the other shaft could be extended outwardly of the frame through a bearing support. However, the errors resulting from friction and side play in the bearing support would be such as to render this solution impracticable in a device having such small amounts of motion of the output shaft. Accordingly, it is an object of this invention to provide a torque motor having an improved means for mounting the armature thereof, which is particularly adapted for use in a rotary output torque motor, which will eliminate side play and friction such as are attendant to the use of bearings for support of the armature shaft and which will, at least in part, provide the resilient restraint of the armature.

Other objects will be in part obvious, and in part pointed out in more detail hereinafter.

The invention accordingly consists in the features of construction, combination of elements and arrangement of parts which will be exemplified in the construction hereafter set forth and the scope of the application of which will be indicated in the appended claims.

Figure 1:
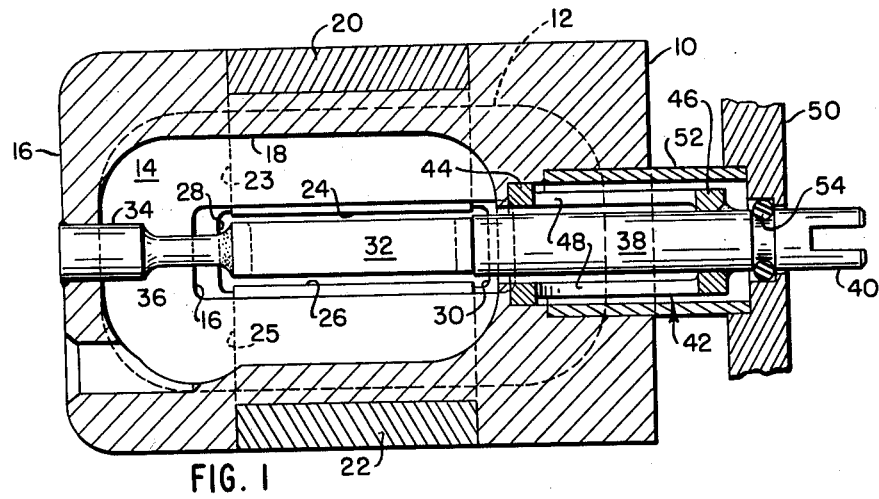
FIG. 1 is a cross sectional view of a torque motor embodying armature mounting means of the present invention.

With reference to the drawing, and particularly FIG. 1, a torque motor, and particularly one with which this invention is concerned, comprises a housing including a frame 10. The frame 10 is generally rectangular in shape and has a pair of cavities or recesses 12 (only one of which is shown) at its opposite ends respectively. The cavities 12 are arranged concentrically of the longitudinal axis of the frame, and in each of the cavities is received a control coil or winding 14 having a central generally rectangular opening 16 disposed concentrically of the cavity. The cavities 12 are connected by an opening 18 in the frame which is offset to the left, as shown in FIG. 1, from the longitudinal centerline of the frame and cavities 12, so that the sidewall of the frame on the right, as shown in FIG. 1, is substantially thicker in the center portion thereof than is the opposite sidewall of the frame. Mounted on the top and bottom of the frame and forming a part of the housing are a pair of pole pieces 20 and 22, respectively, having depending end portions 23, 25 respectively. A pair of U-shaped permanent magnets 28 and 30 are mounted on each end of the frame. Each of the magnets at each end of the frame has a pair of pole faces of opposite polarity in contact respectively with the sides of the depending portions 23, 25, of the pole pieces 20 and 22. The magnets are arranged so that all of the poles of like polarity of the magnets are in magnetic connection with a common pole piece. Accordingly, the oppositely facing surfaces 24, 26 of the ends of the depending portions 23, 25 of the pole pieces 20, 22 provide pole faces of opposite polarity at each end of the frame.

Figure 2:
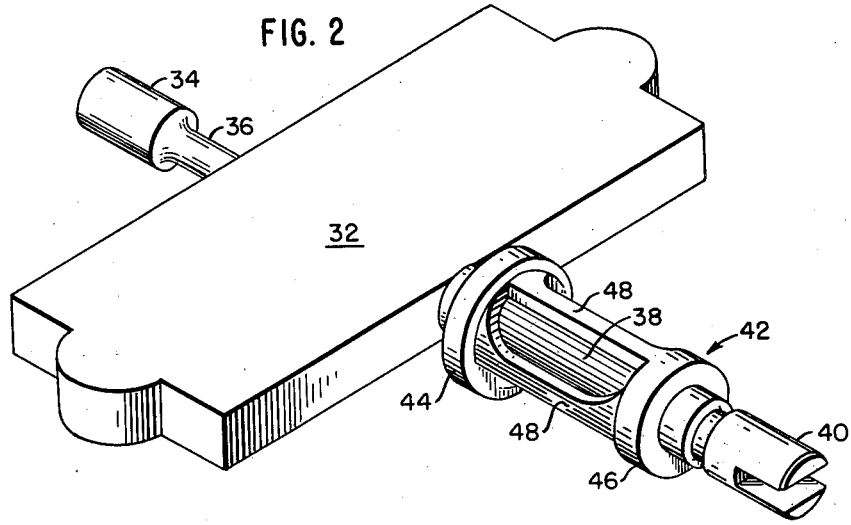
FIG. 2 is a perspective view of the armature and mounting means therefor of the torque motor of FIG. 1.
Figure 3:
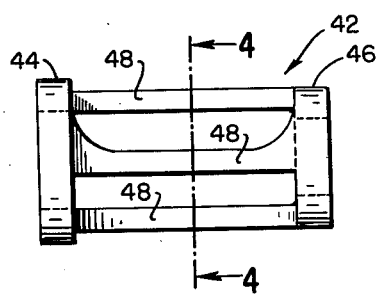
FIG. 3 is a side elevational view of a torsional flexure member forming a part of the armature mounting means of the torque motor of FIG. 1.
Figure 4:
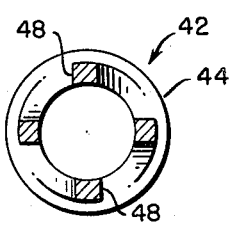
FIG. 4 is a cross sectional view substantially along the line 4—4 of FIG. 3.

Extending concentrically of the opening in the coils 16 is an armature 32 which, as most clearly seen in FIG. 2, is generally rectangular in configuration. Each end of the armature is disposed in spaced relation between the oppositely facing pole faces 24 and 26 at the corresponding end of the frame. The armature is supported, intermediate its ends, on the frame by means hereinafter described, whereby the armature is mounted for resiliently restrained pivotal movement about its lateral centerline. Thus, the ends of the armature are movable in a direction extending between the pole faces 24 and 26. The armature provides a flux path between the pole faces at each end of the armature and also longitudinally through the armature from each pole face to the pole face of opposite polarity at the other end of the armature. In the operation of a torque motor, as is well known, a control signal, differential or otherwise, impressed on the control coils 14 will effect movement of the armature relative to the pole pieces and about its pivotal axis.

The armature is, in part, mounted on the frame 10 by means of a stub-shaft 34 rigidly connected to the armature at one end and at its other end rigidly connected to the frame. The shaft 34 extends coaxially of the lateral centerline of the armature, and in the embodiment shown, the shaft 34 is necked down intermediate its ends, as at 36, to permit limited angular movement of one end of the shaft relative to the other about the shaft axis. In accordance with the invention, on the other side of the armature, there is mounted a shaft 38 which is rigidly connected at one end to the armature and extends coaxially of the shaft 34 and outwardly of the frame 10 through an opening in the thickened sidewall on the right side of the frame, as viewed in FIG. 1. The shaft 38 is provided at its outer end with a forked or bifurcated portion 40 for providing a rotative driving connection to an external device. The shaft 38 is supported on the frame for resiliently restrained movement about the axis of the shaft by an elongated hollow flexure member 42 arranged coaxially over the shaft. In the specific embodiment shown, the flexure member comprises a pair of spaced apart annular end portions 44 and 46, respectively. The end portions 44 and 46 are connected by a plurality of flexure elements 48 extending parallel to the axis of the shaft 38 and arranged angularly thereabout in spaced relation thereto. The inner annular end portion 44 of the flexure member 42 is rigidly connected to the frame 10 and is spaced radially outwardly from the shaft 38. The outer annular end portion 46 is engaged over the shaft 38 to which it is rigidly connected such as by brazing.

As will be apparent from the drawing, the flexure member 42 supports the shaft 38 in coaxial alignment with the shaft 34 and at the same time permits limited resiliently restrained angular movement of the shaft 38 about its axis due to flexing of the flexure elements 48. While the flexure member permits angular movement of the shaft, it assures that there will be no side play of the shaft as may occur where conventional bearings are used to support the shaft. Further, the flexure member 42 is fabricated of a suitable metal to assure that it will be rigid with respect to longitudinal displacement of the ends thereof toward each other. Thus, as will be apparent from the above, the flexure member is, for all intents and purposes, rigid with respect to relative displacement of the ends thereof in directions parallel to and at right angles to the shaft axis. With the armature mounting structure of this invention there is thus provided means for obtaining a rotary output from a torque motor of the type shown in a manner which eliminates any side or axial play of the shaft, accurately supports the shaft, in coaxial alignment with the pivotal axis of the armature, and affords resilient restraint to pivotal movement of the armature about this axis. The dimensions and relative location of the flexure element 48 will determine the torsional spring constant of the flexure member 42. The torsional spring constant of the flexure member may, of course, be selected, as desired, to be at a value necessary for proper operation of the device. The flexure elements 48 and the end portion 44 of the flexure member being spaced from the shaft, in a direction radially of the shaft axis, assure movement of the shaft about its axis without any frictional restraint thus eliminating output signal errors.

As shown in FIG. 1, the torque motor is mounted in fluid sealed relation to a housing 50 or the like enclosing the member (not shown) to be driven by the torque motor. In order to accurately locate the motor on the housing, a bushing or sleeve 52 is seated at one end in an enlarged portion of the opening in the motor frame 10 which the shaft 38 extends. The bushing 52 extends in coaxial, radially outwardly spaced relation to the flexure member 42, and its outer end is engaged in a recess in the housing 50. The forked end 40 of the shaft 38 extends into the housing 50, and a fluid-tight seal is provided between the shaft 38 and housing 50 by means of an O-ring 54 engaged in a circumferential groove on the shaft. The O-ring is tightly engaged between the shaft and housing, and because the angular movement of the shaft 38 is relatively small, i.e. on the order of ±12 milliradians, there will not be any relative sliding or slipping movement between the seal and shaft or housing. Rather, the O-ring will merely deform during angular movement of the shaft. Accordingly, the O-ring will add some resilient restraint to shaft movement but will not introduce any friction errors into the system which could adversely affect the hysteresis, or in other words the accuracy of returnability of the shaft. It will be apparent that if a solid walled cylinder or tube is used as the flexure member 42, then there would be provided a fluid seal between the shaft 38 and frame 10 of the motor which might eliminate the necessity for the O-ring seal 54.

While in the specific embodiment disclosed, the armature is supported only on one side thereof by the armature supporting means of the invention, it will be apparent to those skilled in the art that, if desired, a similar supporting structure could be provided on both sides of the armature resulting in two rotary output shafts extending outwardly of the housing, or if desired, the shaft and flexure member on one or both sides of the armature could be contained wholly within the housing. Accordingly, inasmuch as these and other changes could be made in the above described construction, and many apparently widely different embodiments of this invention could be made without departing from the scope thereof, it is intended that all matter contained in the above description or shown in the accompanying drawing shall be interpreted as illustrative and not in a limiting sense.

It is also to be understood that the language of the following claims are intended to cover all of the generic and specific features of the invention herein described and all statements of the scope of the invention which as a matter of language might be said to fall therebetween.

Having thus described my invention, I claim:

1. A torque motor having a rotary output motion comprising, in combination, a frame, an armature, means mounting said armature intermediate its ends within said frame for pivotal movement about an axis while restraining it from translational movement along and across said axis, said armature mounting means including a shaft rigidly connected to one side of said armature and extending outwardly from one side thereof coaxially with said axis, the outer end of said shaft being free and rotating with said armature to provide the rotary output of the torque motor, an elongated torsional flexure member for supporting said shaft and the armature secured thereto, said flexure member preventing translational movement along and across said axis while permitting resiliently restrained rotation of said shaft, said torsional flexure member being arranged coaxially over said shaft, the end of the flexure member next adjacent to the armature being rigidly connected to said frame, and the other end of the flexure member remote from the armature being rigidly connected to the shaft, said flexure member being rigid with respect to relative translation of its ends in directions longitudinally of and across said axis, the outer end of said shaft extending beyond the end of said flexure member remote from the armature, and being adapted to be connected to a driven element.

2. The combination defined in claim 1 which includes means forming a housing enclosing said torque motor, means securing said torque motor to said housing, said securing means including an elongated imperforate hollow member surrounding said flexure member and secured at its ends in sealing relation to said housing and said torque motor frame, the outer end portion of said torque motor shaft extending through said housing means, and an annular resilient sealing element engaged about said shaft and with said housing to provide a seal between the outer end portion of said shaft and said housing.

References Cited in the file of this patent

UNITED STATES PATENTS

| | | |
|---|---|---|
| 2,891,181 | Atchley | June 16, 1959 |
| 2,905,871 | Martin | Sept. 22, 1959 |
| 2,962,611 | Atchley | Nov. 29, 1960 |